United States Patent [19]

Gillen et al.

[11] 4,235,403

[45] Nov. 25, 1980

[54] SPEED CONTROL APPARATUS AND METHOD FOR RAILROAD CAR RETARDERS

[75] Inventors: Harold C. Gillen, Plum Borough; Donald R. Little, Hempfield Township, Westmoreland County, both of Pa.

[73] Assignee: American Standard Inc., Swissvale, Pa.

[21] Appl. No.: 32,046

[22] Filed: Apr. 23, 1979

[51] Int. Cl.³ .............................................. B61K 7/12
[52] U.S. Cl. ............................. 246/182 A; 104/26 A
[58] Field of Search .... 246/182 A, 182 AA, 182 AB, 246/182 BH; 104/26 A, 26 B; 188/62

[56] References Cited

U.S. PATENT DOCUMENTS

| | | | |
|---|---|---|---|
| 3,110,461 | 11/1963 | Brockman | 246/182 A |
| 3,515,867 | 6/1970 | Seay | 246/182 A |
| 3,745,334 | 7/1973 | Wong et al. | 246/182 A |
| 3,844,514 | 10/1974 | DiPaola et al. | 246/182 A |
| 3,946,973 | 3/1976 | Budway et al. | 246/182 BH |

*Primary Examiner*—Reinhard J. Eisenzopf
*Attorney, Agent, or Firm*—A. G. Williamson, Jr.; R. W. McIntire, Jr.

[57] ABSTRACT

An acceleration servo control system for railroad car retarders in which a computed desired instantaneous deceleration signal and a measured actual deceleration signal are compared and any resulting error signal is fed back through the servo network to adjust retarder braking pressures to achieve and/or hold the desired deceleration rate which will allow the cut of cars to leave the retarder at a selected speed. The desired instantaneous deceleration is computed using an algorithm incorporating actual measured speed, the selected exit speed, the number of axles in the retarder, and the remaining distance-to-go for all axles of the cut over which retarder braking will be effective, and based on the principle of braking each axle-wheel unit throughout the entire retarder length.

11 Claims, 1 Drawing Figure

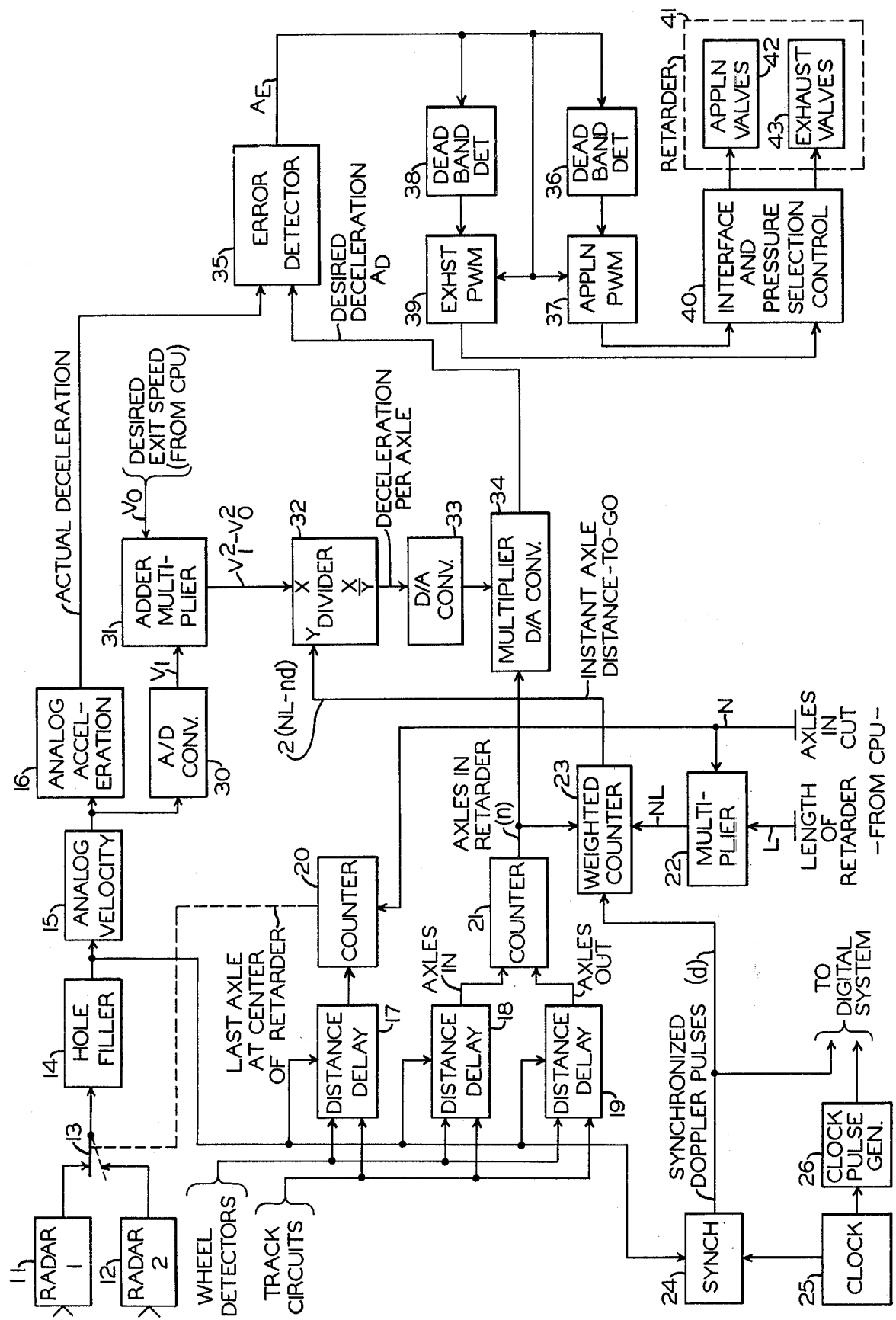

SPEED CONTROL APPARATUS AND METHOD FOR RAILROAD CAR RETARDERS

BACKGROUND OF THE INVENTION

Our invention pertains to speed control apparatus for railroad car retarders. More specifically, the invention relates to apparatus and a method for utilizing the full length of a railroad car retarder to control the speed of cars so as to obtain a desired leaving speed.

Most existing and prior art speed control systems for railroad car retarders follow the velocity servo principle and operate to quickly reduce the speed of a car entering the retarder to the desired or selected leaving speed. The retarder then is released to allow the car to roll free at this selected speed. Since each retarder is normally at a preset pressure prior to the entry of the car, this speed reduction occurs early during the passage of the car, i.e., high up in the retarder. The car or cut then, upon retarder release, accelerates and normally exceeds the selected leaving speed. This necessitates reclosing the retarder to again reduce the car speed to the proper level. This action cycle may actually be repeated more than once during the passage of a cut of cars through the car retarder operating on this principle. The repeated release and reclosing of the retarder uses, even wastes, an excessive amount of energy, e.g., pressurized air requiring expenditure of additional power to replace the compressed air. Further, the rapid slowing of the car produces uneven wear of the retarder braking shoes or bars since most of the braking action occurs in the initial portion of the retarder. Spreading the speed reduction of the cut over the entire length of a retarder will conserve energy, e.g., compressed air, and produce even wear on the retarder braking elements. In addition, use of lower braking pressures reduces the breakage of the retarder parts with possible attendant lessening of the cracking of car wheels due to excessive braking pressures.

Accordingly, an object of our invention is an improved speed control system for railroad car retarders which utilizes the full length of a retarder to obtain the desired leaving speed.

Another object of the invention is an acceleration servo speed control system for railroad car retarders.

A further object of our invention is a method of controlling car retarders by determining the absolute acceleration each cut of cars should have, at each instant during its passage through the retarder, to exit at the desired speed, based on the number of axles within the retarder length and the distance each axle must move within the retarder and then controlling the retarder pressure to obtain such instantaneous acceleration.

Yet another object of the invention is control apparatus for a railroad car retarder which continuously determines the deceleration a moving car must have over the entire length of the retarder to exit at a preselected leaving speed.

It is also an object of the invention to provide an acceleration feedback servo control system for railroad car retarders which is based on a control algorithm incorporating the measured speed, a desired leaving speed, the number of axles, and the total distance of axle movement remaining in the retarder to compute an instantaneous deceleration factor which can be compared with the measured deceleration to develop an acceleration error for servo feedback control of the retarder.

A still further object of our invention is a method of controlling the speed of a car moving through a car retarder to achieve a selected leaving speed using the entire length of that retarder, in which an instantaneous deceleration factor is computed using an algorithm incorporating measured speed, desired leaving speed, and the remaining distance all axles will be under retarder control, the computed deceleration then being compared with the actual measured deceleration of the car in a feedback servo network to vary the braking pressure to match the deceleration rates and thus obtain the desired leaving speed only as the last axle of the car leaves the retarder.

Other objects, features, and advantages of the invention will become apparent from the following specifications and appended claims when taken in connection with the accompanying drawing.

SUMMARY OF THE INVENTION

According to our invention, by means of a generated control algorithm, each cut of cars is retarded using all axles equally over the full length of the car retarder. In theory, the desired exit speed is then achieved just as the last axle leaves the retarder. The solution to the algorithm, in a form practical for use with conventional apparatus, is a desired deceleration signal which can be compared with the measured actual deceleration and fed back through an acceleration servo network to control the retarder to match the desired and actual decelerations by varying the cut speed. The algorithm is based on the existing car speed, the desired exit speed, and the acceleration (deceleration) distance remaining. Specifically, the algorithm makes the desired deceleration factor equal to the difference between the square of the velocity factors divided by twice the distance factor with the quotient multiplied by the number of axles presently in the retarder. Since retardation of each axle-wheel set through the entire retarder length is planned, the algorithm is adjusted to incorporate the sum of all forces applied to each axle. For this reason, the remaining acceleration/deceleration distance used in the algorithm is determined by subtracting from the initial total distance over which the forces act, i.e., the product of the retarder length and the total number of axles, a factor representing the sum of the instantaneous distances traveled into the retarder by all the axles.

The invention also supplies an apparatus network to develop the data for and solve the algorithm and then apply the result, that is, the desired deceleration, to the servo feedback circuits to control the retarder to achieve the desired exit speed. A radar velocity signal is used to provide the current speed of the cut of cars and also to provide a measure of the actual deceleration at each instant. Based on the inputs from various detector means along the wayside, the count of the axles entering and leaving the retarder is maintained so that the number of axles in the retarder is thus known. The number of axles in each cut of cars is determined prior to the cut entry and is multiplied by the known retarder length to give the total available axle decelerating or braking distance for that cut. The travel of the axles within the retarder is measured in increments of distance established by the frequency of the doppler radar pulses used in measuring cut speed. The initially available total axle braking distance, a count of the axles in the retarder, and the doppler based axle distances traveled are combined by logic means to give the remaining axle distance-to-go at each instant, which factor is multiplied by two (2) within the logic elements. The selected exit speed for the cut and the actual velocity as measured are processed to give a difference of the squares of these two items which is then divided by the doubled remaining axle distance-to-go signal to provide the desired deceleration per axle which can then be multiplied by the total number of axles within the retarder to provide the instantaneous desired deceleration which is the solution to the algorithm. This processed signal and the actual deceleration measurement are fed into an acceleration servo network to control the retarder braking pressures to obtain and hold the desired deceleration rate and thus produce the selected exit speed.

BRIEF DESCRIPTION OF THE DRAWING

The single drawing FIGURE is a schematic block diagram flow chart illustrating a conventional car retarder speed control system embodying features of our invention. As in any flow chart, the blocks represent functions in accordance with the designation within the block. Further, the connecting lines represent flow of control or actuating signals and do not designate electrical connections. Where pertinent, such lines are designated by a symbol or note as to the control function signal or data which it represents. External signals are provided by a central processing unit (CPU) for the classification yard control as designated by appropriate notes. Other data or information concerning the cut of cars and its parameters is received direct from wayside apparatus making the required measurements or detections.

DESCRIPTION OF THE ILLUSTRATED EMBODIMENT

The improved retarder control arrangement of this disclosure is based on a theory of control which envisions the retarder being preset before the car or cut of cars enters with an ideal braking force or pressure which supplies just sufficient retardation throughout the entire length to bring the cut, just as its last axle leaves the retarder, to exactly the desired, i.e., computed, leaving speed for proper coupling to other cars previously stored in the yard. To implement such an ideal, theoretical control operation, an acceleration feedback servo system is envisioned based on the following ideal control algorithm:

$$A_{DN} = a - n \frac{V_F^2 - V_D^2}{2D_T} \quad (1)$$

where:
$A_{DN}$=Absolute acceleration of cut during interval with n axles in the retarder.
a=Instantaneous "free rolling" acceleration.
n=Number of axles in retarder.
$V_F$=Projected "free rolling" exit speed.
$V_D$=Desired exit speed.
$D_T$=Instantaneous "axle feet" remaining.

This expression presents, in closed form, the desired absolute acceleration of the cut in a form directly comparable to the acceleration derived from the radar velocity signal. The signal representing $A_{DN}$, therefore, becomes the reference input, or "ideal", for the retarder acceleration servo loop. This closed loop servo system has the function of making the actual acceleration of the cut, as measured by taking the derivative of the radar velocity signal, conform to the desired acceleration $A_{DN}$. It is important to note that the equation for $A_{DN}$ is being continuously updated and compensates for past errors or inaccuracies in the servo control. The continuous calculation of $A_{DN}$ provides a converging sequence where errors are compensated "out" and the control "averages" unwanted perturbations over the remaining control distance and time rather than making abrupt corrections which tend to provide unstable response.

Implementation of the control system, using the equation for $A_{DN}$, requires that the number of axles in the retarder be known at all times. The desired decelerating rate changes by an incremental amount each time an additional axle either enters or leaves the retarder. In an "ideal" situation, there exists an air pressure which, if placed in the braking cylinders before the cut enters the retarder, would not require any change to allow the cut to exit at the proper speed. For this case, the instantaneous force applied to each wheel would be constant and the resulting time graph of acceleration would indicate step changes of equal magnitude as axles enter or leave the retarder. This type of control results in uniform wear in the retarder while reducing wasted compressed air and minimizing noise.

The instantaneous "free rolling" acceleration term a represents the absolute acceleration the cut would experience if the retarder was suddenly opened and is the instantaneous vectorial sum of all forces acting on the cut. This includes the effects of grade, rolling resistance, wind resistance, etc. Although an exact representation of this term is very complicated, a reasonable approximation can be obtained by assuming a fixed rolling resistance and further assuming equal distribution of mass over the length of the cut. This allows the term to be generated as a function of position and the length of the cut.

The projected "free rolling" exit speed $V_F$ represents the speed the cut would achieve as it leaves the retarder if no energy was taken out by the retarder, i.e., the exit speed attained if the retarder was open. Although this term would also be affected by many factors, an approximation can be obtained by assuming a fixed rolling resistance and subtracting an equivalent velocity loss from the change in velocity calculated from the difference in potential energy represented by the initial and final vertical positions of the cut. This is to say that the change in vertical height of the cut less a rolling resistance reduction can be translated into a change in velocity at the exit end of the retarder.

The term $D_T$ is the instantaneous number of axle feet the cut of cars must travel to exit the retarder. By way of example, assuming a retarder length of 90 feet, a one-car cut with four axles will initially have a $D_T$ factor of four times 90 feet or 360 feet total. In other words, the retarder will exert the selected braking pressure on the four pairs of wheels over a total of 360 feet of travel. This initial value decreases 1 foot for each foot of travel by each axle through the retarder. In a hypothetical example, a single-car cut, having two 2-axle trucks with 50 feet between the first and and last axles and a 5 foot spacing between the axles on each truck, is assumed to be moving through the same 90-foot retarder. When the last axle-wheel set is just entering the retarder, the initial axle feet factor of 360 has been reduced by, 50 feet for the first axle plus 45 feet for the second axle plus 5 feet for the third axle (first axle of the second truck), and $D_T$ now equals 260 feet. Said in another way, the remaining axle feet comprise 40 feet for the first axle, 45 feet for the second axle, 85 feet for the third axle, and 90 feet for the last axle for a total of 260 feet.

In an actual control arrangement for a retarder based on the preceding theoretical considerations, a practical system is developed according to the following discussion. The basic theory of retarder operation is to generate a control algorithm wherein a cut is retarded by using all axles in that cut equally over the full length of the retarder. In other words, the car will be retarded so as to have its velocity just reach the desired exit speed when the last axle and wheel set leaves the retarder.

Using basic equations for constant rectilinear acceleration of a theoretical simple rigid body, sliding or moving on an inclined plane, the following algorithm, representing retardation of one axle-wheel set of a railroad car, can be developed:

$$A_D = (V_1^2 - V_0^2)/2x \quad (2)$$

where:
$A_D$ = desired deceleration
$V_1$ = current velocity
$V_0$ = desired exit velocity
$x$ = accelerating distance Considering a car cut being retarded by the sum of braking forces being applied to all the axles, i.e., the corresponding wheels, the above equation becomes:

$$A_D = n \frac{V_1^2 - V_0^2}{2x} \quad (3)$$

where n is the number of axles in the retarder at any instant in time.

We shall further consider the initial available accelerating distance to be NL, where N is the number of axles in the cut and L is the length of retarder. Also, the distance traveled into the retarder by all axles at any instant of time is considered the summation of incremental distances nd, where n is the instantaneous number of axles in the retarder and d is a distance equal to one doppler pulse. Combining these two expressions gives (NL−Σnd), the remaining axle decelerating distance at any instant of time. Substituting this expression into the preceding acceleration equation yields the instantaneous desired deceleration:

$$A_D = n \frac{V_1^2 - V_0^2}{2(NL - \Sigma nd)} \quad (4)$$

We shall now describe, in a functional manner, a retarder control system as shown by the block diagram in the single drawing figure. This diagram depicts the implementation of the above-developed algorithm (4) and shows the basic interface between the servo network and the retarder control apparatus. The block diagram is simplified in that the detailed circuitry and the digital circuitry control are omitted, since it is intended only to depict the data and control functions flow in generating the control algorithm and using its computed deceleration factor.

Referring to the drawing, one or the other of the two radar units 11 and 12, as selected by switch 13 in accordance with the position of the cut in the retarder, supplies the measured speed information regarding the car or cut moving through the retarder. The output signal from the selected radar unit is applied to Hole Filler element 14 which is designed to fill in holes in the doppler signal that are generated primarily by multipathing and target shift of the radar beam. These holes indicate changes of speed much greater than can be realized in the actual physical system. This hole filler thus accomplishes a filtering effect and reduces perturbation of the servo by unrealistic step function changes in the speed data. Blocks 15 and 16 are circuits providing analog signals representing car velocity (speed) and acceleration, respectively, from the doppler signals received through Hole Filler 14.

Distance Delay blocks 17, 18, and 19 represent nearly identical digital circuitry that is given wheel position information by track circuits and wheel detectors positioned along the wayside in approach to the car retarder. Using doppler pulses produced by hole filler 14, the distance delay circuitry then tracks the axles and provides information as to when the axles enter, leave, or are at the center of, the retarder. Counter block 20 keeps track of the axles passing the center of the retarder and its output when the last axle of a cut reaches that location is used to switch between the two radar units for an accurate measurement of car speed. This counter block, the switching device 13, and one radar unit will not be required if it is decided that a single radar will provide sufficiently accurate measurements over the entire length of the retarder. Block 21 is another axle counter which responds to the outputs from units 18 and 19 to provide the factor n used in the algorithm, that is, the number of axles actually in the retarder at any instant.

Multiplier block 22 receives from the yard central processing unit (CPU) the length of the retarder (L) and the total number of axles (N) of the cut currently approaching the retarder. The retarder length factor may be permanently programmed or stored in the multiplier unit since it is a fixed number. The output from unit 22 is then the initial axle distance-to-go, the element or factor NL of the algorithm. The output signal NL presets the weighted counter unit 23 at the beginning of each control run or operation, i.e., as a new cut enters the retarder. By counting the doppler pulses d, as a function of the variable factor n from counter 21 (the instantaneous number of axles in the retarder) down from the present position NL and doubling the result, the output of unit 23 is the denominator term 2(NL−Σnd) of the algorithm. The doppler pulse input to counter 23 is provided by the synchronizing element 24 which synchronizes the hole filled doppler pulses from unit 14 with the system clock pulses from clock unit 25. These synchronized pulses and several phases of clock pulses produced by clock pulses generator 26 are supplied to control the operation of the digital circuitry of the system in the proper manner. In other words, the system feeds on the doppler pulses from the radars but is actually run by the internal clock pulses from element 25.

The output of the analog to digital (A/D) converter 30, which receives the analog velocity input signal, is the current or instantaneous actual cut speed signal $V_1$. This signal is supplied to one input of the Adder-Multiplier unit 31. A second input to unit 31 is the desired speed for the cut upon leaving the retarder, the signal $V_0$ which is supplied at the proper time or upon request from the CPU of the yard control system. Unit 31 provides the necessary arithmetic functions to act on the two input signals to produce the output $V_1^2 - V_0^2$ which is the numerator of the algorithm.

The output of multiplier 31 is supplied to a divider unit 32 which also receives the output signal $2(NL - \Sigma nd)$ from the weighted counter element 23. As indicated, unit 32 operates to divide the first of these signals by the latter signal and provides a digital output which represents the desired deceleration per axle of the cut at each instant. This digital signal is passed through the D/A converter 33 to transform it into an analog signal representing the same deceleration per axle. The Multiplier, D/A converter 34 receives this signal from unit 33 and also the digital signal from counter 21 representing the number of axles in the retarder at any instant (n). Unit 34 completes the solution to the algorithm so that its output is the instantaneous desired deceleration signal $A_D$.

The Error Detector 35 receives and compares the actual and desired deceleration signals, from units 16 and 34, respectively, and provides the control or deceleration error signal $A_E$. Blocks 36 and 38 generate the necessary control dead zones by detecting desired levels and the direction of deceleration error. As indicated, blocks 37 and 39 are pulse width modulators used to modulate the control signals supplied to the application and exhaust error valves 42 and 43, respectively, in the pneumatic retarder controls designated by the dashed block 41. The pulse width modulators are actuated by the dead band generators in accordance with the error direction and provide modulation as a function of the level of deceleration error within the preselected bands. The modulators are used to allow the servo to achieve smaller increments of change in cylinder pressure and thus realize more stable and accurate operation. The PWM essentially gives a variable gain as a function of control error and thus allows greater flexibility. In the case of an extremely low coefficient of friction car, where it is necessary to go to full line pressure, the PWM goes to 100% so that the only restriction to the rate of pressure increase is the time constant of the air system itself, another distinct advantage. The interface, control, buffer network represented by block 40 is interposed between the PWM network and the actual retarder control valves 42 and 43. The interface circuits provide interlock to inhibit simultaneous application and exhaust of air and include logic to preset the retarder in accordance with the weight class and other data of the approaching cut of cars. The interface network also provides driver circuits for the valve solenoids and similar apparatus. It will be noted that most of these functions are conventional in such apparatus.

A retarder control system embodying the acceleration feedback servo control principle of our invention thus provides a more efficient use of energy by conserving the pressurized air, distributes wear of the retarder braking beams evenly over their entire length, reduces retarder peak stresses, maintains a higher average speed through the retarder and thus minimizes the time spent by each cut within the retarder, and has a potential for better leaving speed accuracy. These advantages are achieved in an efficient manner utilizing the existing portions of the current control apparatus supplemented by the necessary elements to solve the control algorithm. The improved system is thus provided in an economical manner.

Although we have herein shown and described but one example of a retarder control system embodying the apparatus and method of our invention, it is to be understood that various changes and modifications may be made therein within the scope of the appended claims without departing from the spirit and scope of our invention.

Having now described the invention, what we claim as new and desire to secure by Letters Patent, is:

1. A speed control arrangement for a railroad car retarder, to achieve a selected leaving speed for each cut of cars as it exits the retarder, comprising:
    (a) speed measuring means operable for producing signals representing actual speed and deceleration of a particular cut moving through said retarder and other pulse signals representing successive incremental distances traveled within said retarder by that cut,
    (b) distance register means coupled to receive wayside cut detection signals and said incremental distance signals and jointly responsive thereto and to previously registered signals of retarder length and total axles on said particular cut for continuously producing a signal representing the instantaneous remaining axle braking distance within said retarder for said particular cut,
    (c) processing means coupled for receiving the actual speed signal, the selected leaving speed signal, and the corresponding remaining braking distance for said particular cut and operable in response for generating an output signal representing the desired instantaneous deceleration for said particular cut, and
    (d) a servo control means coupled for comparing the desired deceleration signal from said processing means and the actual deceleration signal from said speed measuring means and connected for controlling the retarder braking force to equalize the two deceleration signals to achieve said desired leaving speed for said particular cut as the last axle exits said retarder.

2. A speed control arrangement, as defined in claim 1, in which said distance register means comprises:
    (a) a counter means responsive to said wayside detection signals for registering the instant number of axles of said particular cut within said retarder, and
    (b) a weighted counter means responsive to said incremental distance signals, said registered retarder length and total axle signals, and said instant number of axles within said retarder for supplying said instant remaining axle braking distance signal to said processing means.

3. A speed control arrangement, as defined in claim 2, in which said processing means includes adder, multiplier, and divider elements for dividing the difference between the squares of said actual speed and desired leaving speed signals by twice said instant remaining axle braking distance signal to produce a desired deceleration signal for each axle and for multiplying that signal by said instant number of axles within said retarder to produce said instant desired deceleration signal for said particular cut.

4. A speed control arrangement, as defined in claim 1 or 2, in which said processing means includes adder, multiplier, and divider elements for solving the expression:

$$A_D = n \frac{V_1^2 - V_0^2}{2(NL - \Sigma nd)}$$

where:

$A_D$—is the instant desired deceleration,
$V_1$—is the actual speed,
$V_0$—is the desired leaving speed,
n—is the instant number of axles within, said retarder
$(NL-\Sigma nd)$—is the instant remaining axle braking distance.

5. An apparatus arrangement for controlling the braking pressure of a railroad car retarder to reduce the speed of a cut of cars traversing said retarder using substantially constant braking pressure over the entire length of said retarder so that a preselected desired leaving speed is achieved as the last axle of a cut leaves said retarder, comprising:

(a) speed measuring means responsive to movement of a particular cut in said retarder for continuously generating an actual speed signal and an actual deceleration signal, (b) a first counter means coupled for registering the instantaneous number of axles of said particular car within said retarder, (c) a first source generating a signal representing the total distance all axles of said particular cut will travel while moving through said retarder, (d) a second counter means coupled to said speed measuring means, said first counter means, and said first source and responsive to a selected output from each for generating an output representing the total remaining instant axle distance-to-go for said retarder to control the speed of said particular cut.

(e) a second source providing a signal representing the desired retarder leaving speed for said particular cut, (f) signal processing means coupled to receive an actual speed signal from said speed measuring means, said desired leaving speed signal from said second source, the instant axle distance-to-go signal from said second counter means, and the instant axle count from said first counter means and responsive to said signals for producing a signal representing a desired instantaneous deceleration for said particular cut required to achieve said desired leaving speed when the last axle exists from said retarder, and (g) a servo network coupled to said speed measuring means and said processing means and responsive to the actual and desired deceleration signals for controlling said retarder to equalize the actual and desired deceleration of said particular cut.

6. An apparatus arrangement, as defined in claim 5, in which:

(a) the output of said second counter means is twice the remaining axle distance-to-go, and in which said signal processing means comprises:

(b) an adder-multiplier means coupled for receiving said actual speed signal and said desired speed signal and operable for generating an output signal representing the square of said desired speed signal subtracted from the square of said actual speed signal, (c) a divider means coupled to receive the output signals of said adder-multiplier means and said second counter means and operable for dividing the former signal by the latter signal to produce a desired deceleration signal for each axle in the retarder at that instant, and (d) another multiplier means coupled to receive the output signal of said divider means and said axle count signal from said first counter means and operable for providing said desired deceleration signal for said particular cut to said servo network.

7. An apparatus arrangement, as defined in claim 5 or 6, in which said servo network comprises:

(a) an error detector coupled for receiving said desired deceleration signal and said actual deceleration signal and responsive for producing an error signal representing the difference between the two received signals, and (b) a pulse width modulation means coupled to receive said error signal and responsive to the direction and value of that signal for supplying a pulse width modulated signal to increase or decrease the retarder braking pressure as said actual deceleration signal is less than or more than, respectively, said desired deceleration signal.

8. An apparatus arrangement, as defined in claim 7, in which said pulse width modulation means comprises:

(a) a first and a second dead band detector, each coupled to said error detector and responsive to said error signal for generating an output signal when said error signal is within a selected value band and represents an actual deceleration signal less than or greater than said desired deceleration signal, respectively, (b) an application pulse width modulator coupled to said error detector and to said first dead band detector for supplying a pulse width modulated signal to control said retarder to increase braking pressure by an amount in accordance with the value level of said error signal when said first dead band detector generates an output, and (c) an exhaust pulse width modulator coupled to said error detector and said second dead band detector for supplying a pulse width modulated signal to control said retarder to decrease braking pressure by an amount in accordance with the value level of said error signal when said second dead band detector generates an output.

9. A method of controlling a railroad car retarder to achieve a desired leaving speed for each car cut traversing the retarder, using substantially the entire length of the retarder to continuously brake the cut wheels to achieve said leaving speed when the last axle exits, said retarder comprising the steps of:

(a) continuously measuring actual speed and deceleration of a car cut moving through said retarder, (b) continuously determining the instant remaining axle distance-to-go within said retarder for braking said cut moving through said retarder, (c) mathematically processing the actual and desired leaving speed data and remaining axle distance-to-go for said cut moving through said retarder to continuously produce a desired deceleration value which will achieve the desired leaving speed as the last axle of said cut exits from said retarder, and (d) comparing said actual and desired deceleration values and controlling the braking pressures of said retarder in accordance with detected differences to equalize the two deceleration values.

10. The method of retarder control, as defined in claim 9, in which the step of determining remaining axle distance-to-go comprises the further steps of:

(a) determining the total initial distance available for the retarder to brake the wheels of said cut as the cut approaches said retarder in accordance with the number of axles on said cut and the retarder length, (b) continuously determining the total distance all cut axles have traveled within the retarder at any instant, and (c) subtracting the axle distance traveled within the retarder from said total initial available distance to obtain the remaining axle distance-to-go.

11. The method of retarder control, as defined in claim 9 or 10, in which the mathematical processing step comprises solving the algorithm:

$$A_D = n \frac{V_1^2 - V_0^2}{2(NL - \Sigma nd)}$$

in which:
- $A_D$ is desired deceleration of said cut,
- $V_1$ is actual velocity of said cut,
- $V_0$ is desired leaving velocity of said cut,
- $n$ is number of axles within said retarder,
- $NL$ is initial axle distance-to-go,
- $\Sigma nd$ is instant distances all axles have traveled within said retarder.

* * * * *